Sept. 12, 1933.  S. BABITZKY  1,926,664
BIRD CAGE
Filed April 16, 1931  2 Sheets-Sheet 1

Inventor
Samuel Babitzky.
Attorney

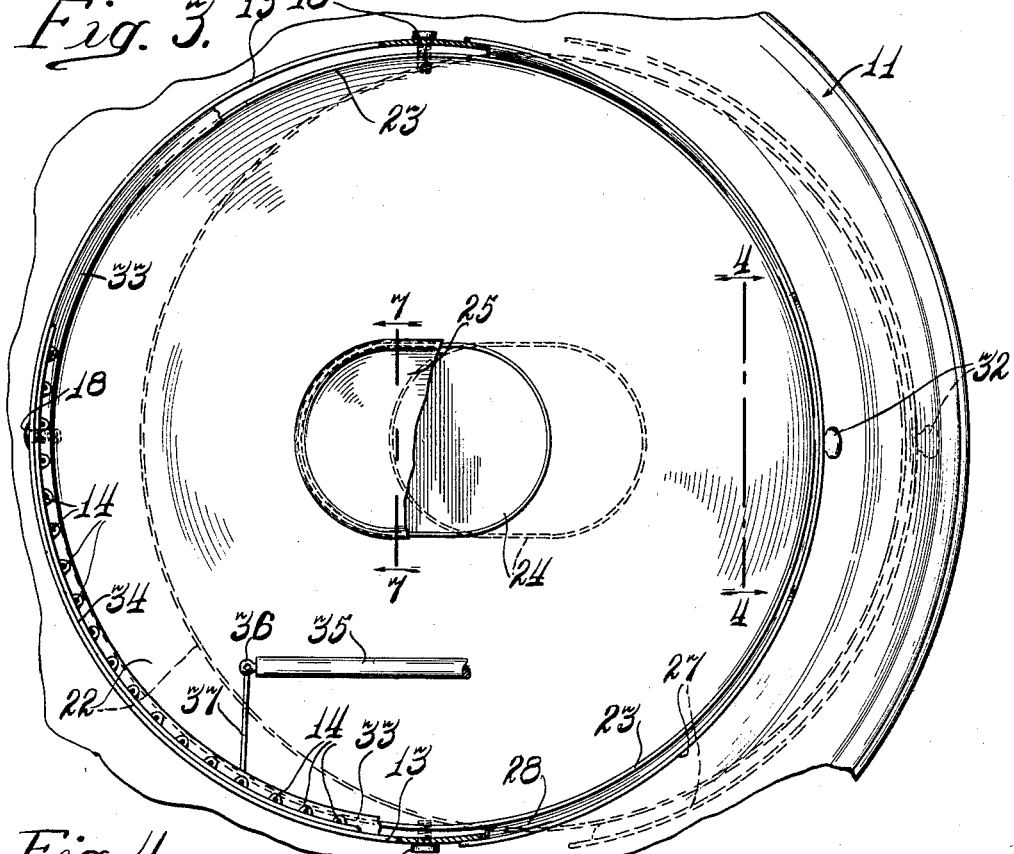
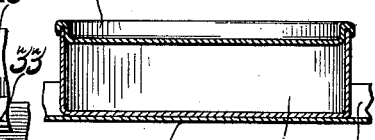
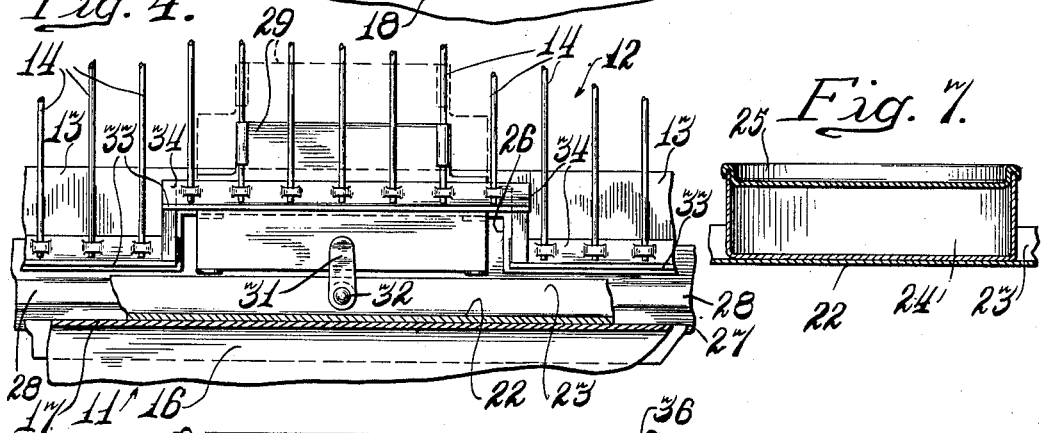
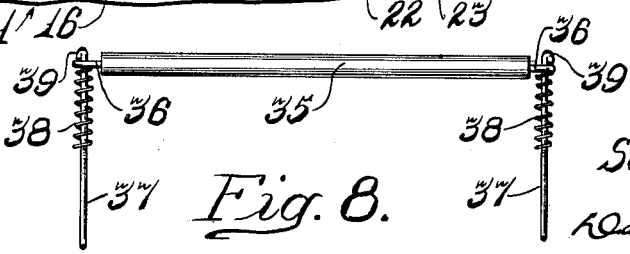

Patented Sept. 12, 1933

1,926,664

UNITED STATES PATENT OFFICE 1,926,664

BIRD CAGE

Samuel Babitzky, Chicago, Ill.

Application April 16, 1931. Serial No. 530,581

4 Claims. (Cl. 119—17)

The invention relates to improvements in cages and particularly to a bird cage having improved means providing for the arrangement of a receptacle or bird bath within the cage.

An object of the invention is to provide an improved bird cage with a receptacle mounted upon a removable tray arranged above the base.

Another object is to provide an improved bird cage with an opening in its circumferential wall to receive a tray; and means for closing a portion of said opening when the tray is withdrawn.

Another object is to provide an improved bird cage of the character referred to with novel means for closing an opening in its circumferential wall when the tray is mounted therein, and means on the tray adapted to co-operate with means on the cage for retaining the tray in position.

Another object is to provide an improved cage having a removable tray and receptacle therein, with an improved yieldably mounted perch.

Another object is to provide a bird cage with improved means for detachably securing the housing to the base.

Another object is to provide an improved article of the character referred to which may be inexpensively manufactured.

The foregoing and such other objects of the invention as will appear hereinafter as the description proceeds, will be more readily understood from a perusal of the following specification, reference being had to the accompanying drawings, in which:

Fig. 3 is a transverse horizontal sectional view of the improved cage, showing the tray in partially withdrawn position in dotted outline.

Fig. 4 is an enlarged fragmentary sectional elevational view, taken on line 4—4 of Fig. 3.

Fig. 7 is a sectional view, taken on line 7—7 of Fig. 3.

Fig. 8 is an elevational view of the improved perch.

Figure 1:
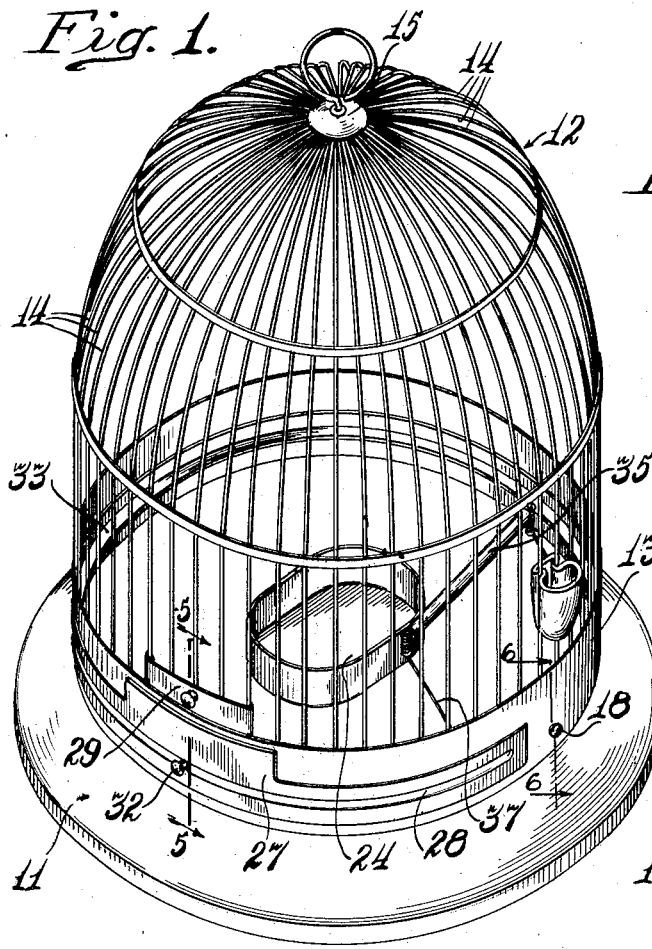
Fig. 1 is a perspective view of the improved bird cage.

The improved bird cage is provided with novel means to facilitate insertion or removal of a liquid receptacle, or bird bath, and means for closing an opening in the side wall of said cage through which said receptacle is inserted.

As shown in the accompanying drawings, the improved bird cage includes the usual base 11 and a housing 12 comprising a mounting ring 13 having stays 14 extending upwardly therefrom and converging towards a common center 15. The base 11 is formed with a circumferential side wall 16 and a top 17. The mounting ring 13 is adapted to fit snugly over the vertical side wall 16 of the base and be removably secured thereon by a plurality of thumb screws 18 threadingly mounted in ring 13 which engage through apertures 19 in the wall 16. Upon manipulation of thumb screws 18, the housing 12 may be removed from the base.

The mounting ring 13 is provided with a horizontal slot 21, the lower edge of which aligns with the top 17 of the base. This slot provides an opening around one side of the housing through which a tray 22 may be inserted. The tray 22 preferably is disc-shaped having an upwardly extending circumferential flange 23 and a receptacle 24, adapted to contain liquid, centrally mounted thereon. The slot 21 in the mounting ring 13 is enlarged at 26 to provide clearance for the liquid receptacle 24 when inserting or withdrawing the tray from the cage. If desired, a cover 25 may be placed over the liquid receptacle to provide for its adaptation to other uses.

Closing of the slot 21, while the tray is mounted within the cage, is accomplished by a finishing plate 27 fixedly secured to the circumferential flange 23 of tray 22. The size of this plate is substantially greater than the size of slot 21 and overlies and completely covers said slot. The tray 22 is smaller in diameter than the mounting ring 13. The finishing plate 27 is, therefore, formed concentric with the mounting ring 13 to provide a substantially smooth outside surface. A longitudinal eccentric rib 28 is formed in the finishing plate which is fixedly secured, as for example by soldering, to the flange 23 of the tray.

A plate, forming a gate 29, is mounted for vertical sliding movement upon stays 14 of the housing to close the enlarged opening 26 when the tray is withdrawn. When the tray is mounted within the cage the plate 29 co-operates with means for securely retaining the tray therein, comprising a latch 31 mounted upon a rotatable handle 32.

Figure 5:
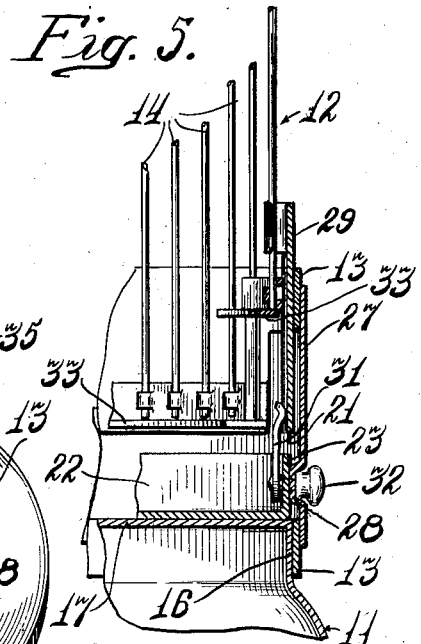
Fig. 5 is a vertical fragmentary sectional view, taken on line 5—5 of Fig. 1.
Figure 6:
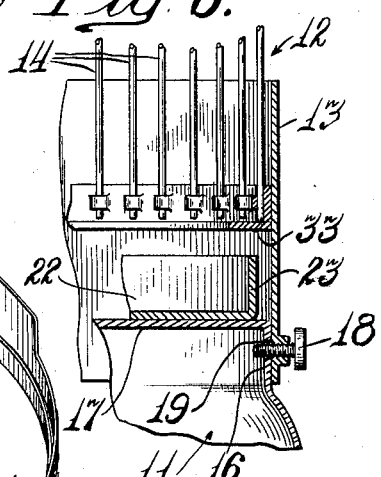
Fig. 6 is a sectional view, taken on line 6—6 of Fig. 1.
Figure 2:
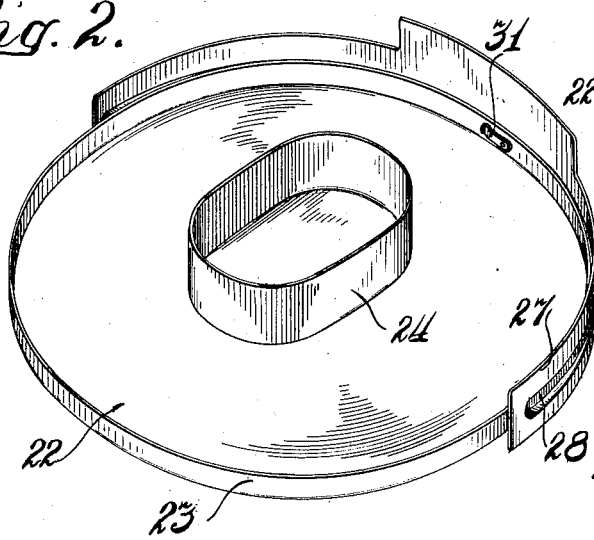
Fig. 2 is a perspective view of the improved tray and receptacle.

To prevent seed, feathers, and other foreign matter from falling onto top 17 of the base when the tray is arranged thereover, an inwardly directed annular flange 33 is provided on the inside face of the mounting ring 13. This flange may be an independent member or an integral part of the stay retaining ring 34 also mounted on the mounting ring. As shown in Figs. 4 and 5, the rings 33 and 34 are offset at the enlarged portion 26 of the slot 21, the remaining portion of the rings being arranged directly above the top of the peripheral flange 23 on tray 22.

An improved perch 35 is also provided in the improved cage, said perch having an eyelet 36 extending outwardly from each end, each of which is slidably mounted upon a wire support 37 fixedly secured at one end to the stay mounting ring 34. A light compression spring 38 is arranged on the vertical portion of each support 37 to provide a yieldable mounting for the perch 35 and the free end of each support is turned over, or otherwise distorted as at 39, to prevent removal of the perch.

Although the preferred construction of the improved bird cage is illustrated in the accompanying drawings and described in detail in the foregoing specification, it is to be understood that the improved cage is capable of embodying various modifications in detail structure without departing from the spirit of the invention or the scope of the appended claims.

I claim:

1. An article of the class described including a base and a housing; a removable tray having a receptacle mounted thereon adapted to be arranged over said base, said housing being slotted to receive said tray; said slot being enlarged in part to admit passage of the receptacle, a closure for said slot mounted on one edge of said tray, and means slidably mounted on the housing for closing the enlarged part of said slot when the tray is removed.

2. An article of the character described including a base and a housing, a removable tray having a receptacle thereon adapted to be arranged over said base, said housing being slotted to receive said tray, said slot being enlarged in part to admit passage of the receptacle, a closure for said slot on said tray, movable means on the housing for closing the enlarged part of the slot, and means on the tray adapted to co-operate with said movable means to lock the tray in position.

3. An article of the character described comprising, in combination, a base; a housing including a mounting ring detachably mounted on said base, a tray, said mounting ring being slotted to admit said tray into the housing over said base, a receptacle fixedly mounted on said tray, said slot being enlarged in part to provide for the passage of said receptacle when the tray is moved into or out of said housing, a closure for said enlargement slidable on said housing, and an arcuate finishing plate secured to said tray for overlying the mounting ring and covering the slot, and means for locking the tray in position.

4. An article of the character described comprising, in combination, a base; a housing including a mounting ring detachably mounted on said base, a tray, said mounting ring being slotted to admit said tray into the housing over said base, a receptacle fixedly mounted on said tray, said slot being enlarged in part to provide for the passage of said receptacle when the tray is moved into or out of said housing, a closure for said enlargement slidable on said housing, and an arcuate finishing plate secured to said tray for overlying the mounting ring and covering the slot, and means on said tray adapted to engage the closure for said enlargement to lock the tray in place.

SAMUEL BABITZKY.